May 14, 1940. H. C. BOWEN 2,200,666
FLUID PRESSURE PRODUCING DEVICE
Filed May 13, 1937 2 Sheets-Sheet 1
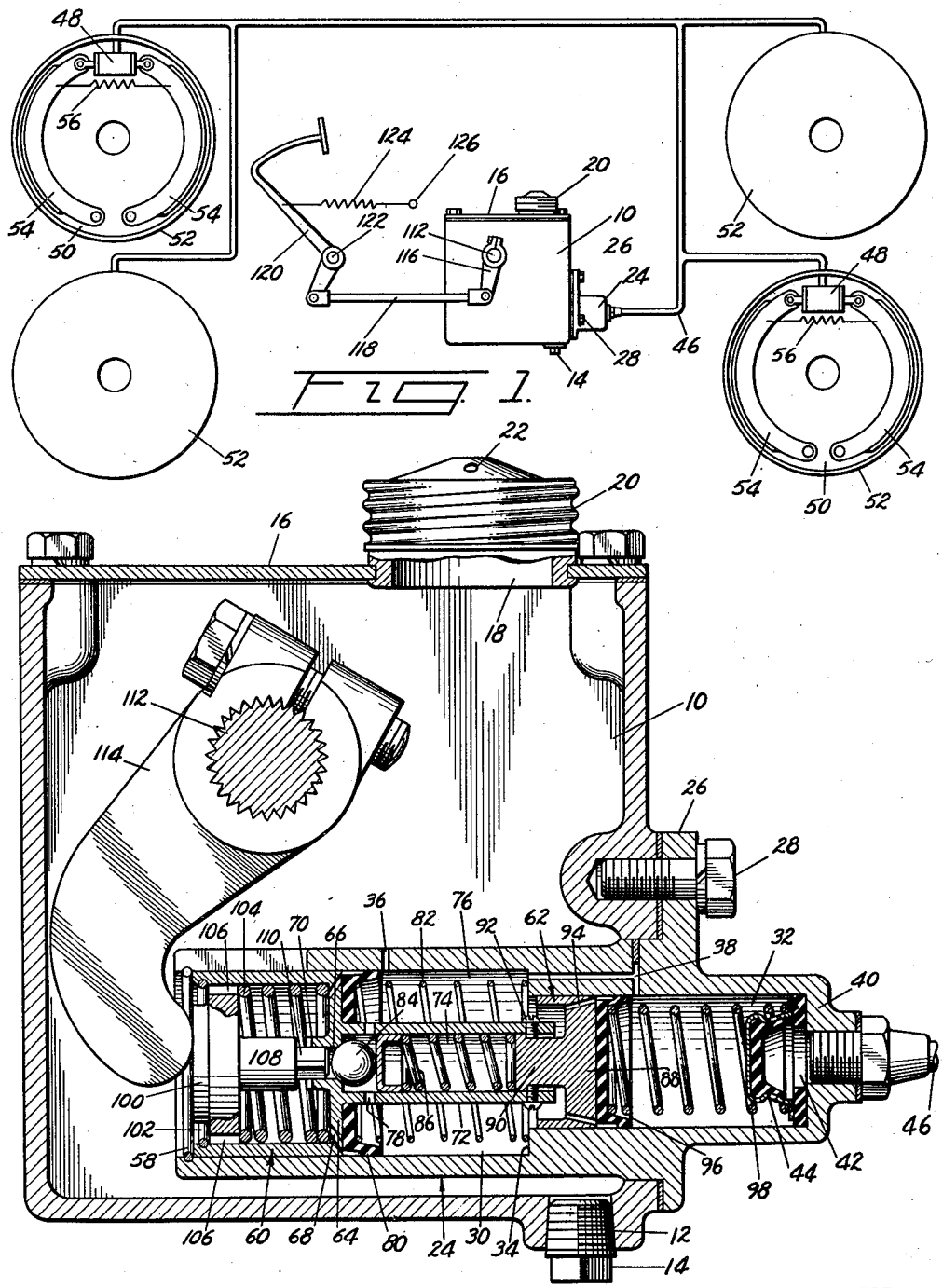
INVENTOR.
*HERBERT C. BOWEN*
BY *Williams, Bradbury McCaleb & Hinkle*
ATTORNEYS.

May 14, 1940.   H. C. BOWEN   2,200,666
FLUID PRESSURE PRODUCING DEVICE
Filed May 13, 1937   2 Sheets-Sheet 2

INVENTOR.
HERBERT C. BOWEN
BY Williams, Bradbury,
McCaleb & Hinkle
ATTORNEYS

Patented May 14, 1940

2,200,666

UNITED STATES PATENT OFFICE 2,200,666

FLUID PRESSURE PRODUCING DEVICE

Herbert C. Bowen, Detroit, Mich., assignor to Hydraulic Brake Company, Detroit, Mich., a corporation of California Application May 13, 1937, Serial No. 142,341

6 Claims. (Cl. 60—54.6)

This invention relates to fluid pressure braking systems for motor vehicles, and more particularly to fluid pressure producing devices for such systems.

Broadly the invention comprehends a fluid pressure producing device wherein the pressure created may be compounded without increase in the applied operating force.

An object of the invention is to provide a fluid pressure producing device wherein the transition from low to high pressure may be distributed so as to smooth out the operation of the device.

Another object of the invention is to provide a fluid pressure producing device wherein the transition from low to high pressure may be effected gradually.

Another object of the invention is to provide a fluid pressure producing device wherein the pressure created may be automatically compounded.

A further object of the invention is to provide a fluid pressure producing device operative to automatically effect, by pressure created in the device, a transition from low to high pressure without increasing the applied operating force and to make this change gradually so as to smooth out the operation of the device.

Other objects and advantages of the invention will appear from the following description taken in connection with the drawings forming a part of this specification, and in which—

Fig. 1 is a diagrammatical illustration of a fluid pressure braking system embodying the invention;

Fig. 2 is a vertical sectional view of the fluid pressure producing device; and

Figure 3:
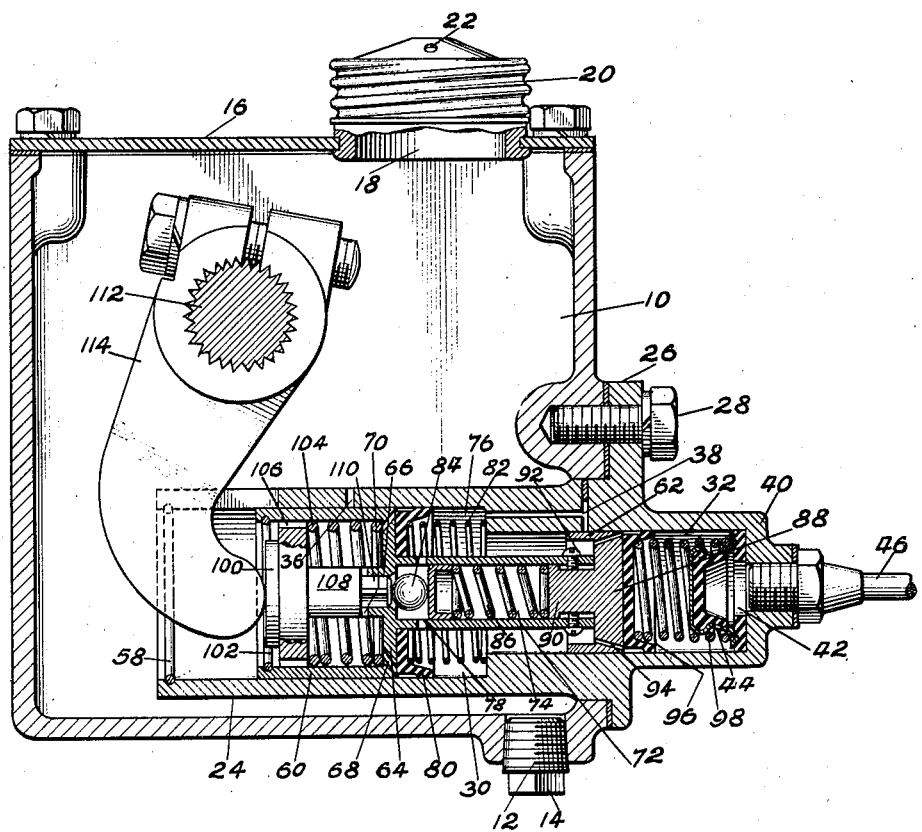
Fig. 3 is a view similar to Fig. 2 but showing the parts in the positions which they assume when the brake is fully applied.

Referring to the drawings, 10 represents a fluid reservoir having a drain opening 12 which may be closed as by a plug 14. The reservoir also has a removable top 16 provided with a filling opening 18 normally closed as by a cap 20 having suitable openings 22 for venting the reservoir to the atmosphere.

A cylinder 24 fitted in an opening in the wall of the reservoir adjacent the bottom thereof has a radial flange 26 secured to the wall as by bolts 28 so as to support the cylinder partly within and partly outside of the reservoir. The cylinder includes a large chamber 30 and a relatively small chamber 32.

The chambers 30 and 32 are arranged concentrically to and in direct communication with one another and provide at their junction an annular shoulder 34, the purpose of which will hereinafter appear. The chamber 30 opens into the reservoir and has a port 36 providing another communication between the chamber and the reservoir. A passage 38 in the wall of the cylinder provides communication between the large and small chambers, and the small chamber has a head 40 provided with a discharge port 42 controlled as by a two-way valve 44 seated on the head 40.

A fluid pressure delivery pipe or conduit 46 connected to the discharge port 42 has branches connected respectively to fluid pressure actuated motors 48 arranged in pairs, one pair for actuating the brakes associated with the front wheels of a vehicle and another pair for actuating the brakes associated with the rear wheels of a vehicle.

The brakes, which may be of any conventional type, preferably include a fixed support or backing plate 50 adapted to be secured to an axle or to an axle housing, a rotatable drum 52 associated therewith and adapted to be secured to a wheel, a pair of corresponding, interchangeable friction elements or shoes 54 having their articulate ends pivoted on the backing plate, and a motor corresponding to the motors 48 mounted on the backing plate between the separable ends of the shoes and operative to spread the shoes into engagement with the drum against the resistance of a retractile spring 56 connecting the shoes.

A compound piston reciprocable in the cylinder is held against displacement by a retaining ring 58 seated in a groove in the wall of the cylinder adjacent the open end of the large chamber 30. This compound piston includes a large piston 60 movable in the large chamber 30, and a relatively small piston 62 movable in the small chamber 32. The large piston 60 comprises a shell open at one end and closed at its other end. The open end normally seats on the retaining ring 58 and the closed end provides a head 64. This head has an axial port 66 and a plurality of spaced ports 68. An annular flange on the back of the head coextensive with the perimeter defining the port 68 constitutes a guide 70, the purpose of which will hereinafter appear, and a concentric hollow cylindrical extension 72 on the head provides a chamber 74 communicating with the shell by way of the port 66 and also provides in conjunction with the wall of the cylinder 24 an annular chamber 76, and ports 78 in the wall of the hollow extension provide communications between the chamber 74 and the annular chamber 76.

A collapsible leak-proof cup 80 seated on the head 64 controls the spaced ports 68, and a spring 82 interposed between the cup and the annular shoulder 34 serves to retain the cup against displacement. The spring 82 also assists in returning the piston to its retracted position. A ball valve 84 in the chamber 74 controls the axial port 66. A spring seat engages the ball and a spring 86 interposed between the seat and the small piston 62 urges the ball valve to its seat. The spring 86 also serves to yieldingly support the small piston 62.

As shown, the small piston includes a head 88 having on its back a concentric extension 90 seated on the spring 86 in the chamber 74 and held against displacement as by set screws 92. The head 88 has therein a plurality of spaced passages 94 providing communications between the annular chamber 76 and the small chamber 32 forward of the piston 62. A collapsible leak-proof cup 96 seated on the head 88 controls the passages 94, and a spring 98 interposed between the cup and the two-way valve 44 seated on the head 40 of the cylinder serves to retain the cup and valve against displacement and also to assist the spring 82 in returning the piston to its retracted position.

A thrust block 100 slidably mounted in the shell constituting the piston 60 is held against displacement by a retaining ring 102 seated in a groove in the wall of the shell adjacent the open end thereof, and a heavy spring 104 interposed between the thrust block and the head of the piston 60 normally retains the thrust block on its seat. The thrust block has a plurality of spaced openings 106 providing communications between the reservoir and the interior of the shell, and a concentric extension or plunger 108 on the thrust block is slidably supported in the guide 70 and is adapted to enter the axial port 66 and dislodge the ball valve 84 from its seat, and the extension 108 is channeled as indicated at 110 to provide for free passage of fluid through the port 66 when the ball valve is open.

A rotatable shaft 112 mounted transversely of the reservoir has keyed thereto within the reservoir an actuator 114 engaging the thrust block 100, and secured to the shaft outside of the reservoir is an arm 116 connected as by a rod 118 to a foot pedal lever 120 pivotally mounted as indicated at 122 and connected as by a retractile spring 124 to a fixed support 126.

Assuming that the system is filled with suitable fluid or liquid, under these conditions, upon depressing the foot pedal lever 120 force is transmitted from the lever through the rod 118, the arm 116, the shaft 112, and the actuator 114 to the thrust block 100, resulting in moving the piston on its compression stroke.

During the initial movement of the piston on its compression stroke, the cup 80 on the head of the large piston covers the port 36 and the cup 96 on the head of the small piston closes the passage 38, and thereafter as the piston progresses on its compression stroke the fluid in the annular chamber 76 is displaced therefrom through the passages 94 in the small piston 62 past the cup 96 into that portion of the small chamber 32 forward of the piston 62, thence through the fluid pressure delivery pipe or conduit 46 and its respective branches into the fluid pressure actuated motors 48. This causes actuation of the motors, resulting in movement of the shoes 54 into engagement with the drums 52.

As the pressure on the liquid in the annular chamber 76 and the small chamber 32 increases, the load on the ball valve 84 increases proportionately, and this augments the load imposed on the valve by the spring 86. When the pressure in the annular chamber 76 and the small chamber 32 reaches a predetermined pressure sufficient to overcome the load on the heavy spring 104, resisting movement of the thrust block 100, plus the combined pressure on the fluid received by the valve and the load on the spring 86 urging the valve to its closed position, the thrust block 100 advances and the plunger 108 carried thereby moves the valve 84 from its seat.

Opening of the valve 84 results in release of pressure on the fluid in the annular chamber 76 accompanied by movement of a small quantity of fluid from the annular chamber 76 through the ports 78, the chamber 74 and the port 66 into the interior of the shell, thence through the ports 106 in the thrust block 100 to the reservoir.

Simultaneously with this action the pressure on the fluid in the small chamber 32 is received by the cup 96 on the head 88 of the small piston 62. During this transition of the pressure the small piston 62 recedes against the resistance of the spring 86 until it eventually seats on the extension 72. This movement of the small piston 62 materially increases the load on the spring 86 urging the valve 84 to its seat.

Since the pressure in the annular chamber 76 has been previously reduced by the cracking of the valve 84 and the load on the valve is now materially increased, there is insufficient force opposed to the applied operative force to maintain the spring 104 sufficiently depressed to retain the head 110 of the plunger 108 on the thrust block 100 in the port 66. Accordingly, the piston advances under the influence of the spring 104 and the plunger releases the ball 84 with the result that the valve moves to its seat and closes the port 66.

Under these conditions, with the piston proceeding on its compression stroke, pressure on the fluid in the annular chamber 76 is built up gradually until it reaches a predetermined magnitude ample to overcome the load on the valve and the load on the heavy spring 104; whereupon the plunger 108 again advances and opens the valve 84, resulting in release of pressure on the fluid in the annular chamber 76 accompanied by movement of fluid from the annular chamber to the reservoir.

This gradual building up of the pressure in the annular chamber 76 provides a constantly decreasing resistance to the applied operating force effective until such time as the applied force is balanced by the pressure on the fluid forward of the piston 62. The result is that the transition from low to high pressure is effected over a wide range tending to smooth out the operation and this change is accomplished without pulsations in the constantly increasing applied force and hence without knowledge of the operator.

After the foregoing transition has been effected, the low pressure piston is rendered inoperative by the fluid from the low pressure cylinder by-passing this piston by way of ports 78, 66, the chamber in the low pressure cylinder, and passages 106, to the reservoir. During this period of operation all force exerted by the operator on the foot pedal 120 is applied to the high pressure piston 62 which creates the desired fluid pressure in the high pressure cylinder, conduits and wheel cylinders. Because of the small area of the high pressure piston and the leverage afforded by the brake pedal and associated linkage, a strong brake action can be obtained by the exertion of only a relatively small force on the foot pedal 120.

Upon conclusion of a braking operation, the foot pedal lever 120 is released and this lever is returned to its retracted position under the influence of the retractile spring 124. As the foot pedal lever returns to its retracted position the actuator 114 connected to the foot pedal lever is also retracted. This results in release of the piston, whereupon the piston is returned to its retracted position under the influence of the springs 82 and 98.

As the piston returns to its retracted position, a partial vacuum is created in the annular chamber 76 and the small chamber 32, resulting in drawing fluid from the reservoir through the port 106 in the thrust block, the shell of the piston 60, and the ports 68 in the head 64 of the large piston, past the cup 80 into the annular chamber 76 and also through ports 94 in the small piston past the cup 96 into the small chamber 32 completely filling the chambers 76 and 32.

During this movement fluid is returning to the cylinder from the fluid pressure actuated motors and the fluid pressure delivery pipes connecting the motors to the chamber 32 and also to the annular chamber 76 by way of passage 38 connecting the chambers 32 and 76, and any excess of fluid over and above the quantity required to completely fill the chambers 76 and 32 is returned to the reservoir by way of the port 36. The port 36 and the passage 38 also provide for egress and ingress of fluid due to expansion and contraction resulting from temperature changes.

The subject matter disclosed herein is claimed more broadly in my copending applications Serial Nos. 689,715 and 143,693 filed September 16, 1933, and May 20, 1937, respectively.

Although this invention has been described in connection with certain specific embodiments, the principles involved are susceptible of numerous other applications that will readily occur to persons skilled in the art. The invention is therefore to be limited only by the scope of the appended claims.

Having thus described the various features of the invention, what I claim as new and desire to secure by Letters Patent is:

1. A pressure producing device comprising a low and a high pressure producing means operative concomitantly, means operative at a predetermined pressure in both pressure producing means to relieve the pressure in the low pressure producing means, means operative upon relief of pressure in the low pressure producing means to retain the pressure in the high pressure producing means, the pressure on the fluid in the low pressure producing means coacting with the relief means for resisting relief of pressure, and means operative at a higher pressure in both pressure producing means to yieldingly oppose relief of pressure in the low pressure producing means.

2. A fluid pressure producing device comprising a reservoir, a cylinder supplied therefrom including a large and a small chamber, a large and a small piston movable in the respective chambers, means connecting the pistons for relative movement, a valve in the head of the large piston, a compression member between the valve and the small piston, and a movable thrust member in the large piston cooperating with the valve to open it.

3. A fluid pressure producing device comprising a reservoir, a cylinder supplied therefrom including a large and a small chamber, a large and a small piston movable in the respective chambers, a sleeve connecting the pistons for relative movement, a valve in the head of the large piston, a compression member in the sleeve between the valve and the small piston, a movable thrust member in the large piston cooperating with the valve to open it, and a compression member between the thrust member and the large piston.

4. A fluid pressure producing device comprising a reservoir, a cylinder supplied therefrom including a large and a small chamber, a large and a small piston movable in the respective chambers, the large piston having passages therethrough and a concentric port, means controlling the passages, a sleeve carried by the large piston having openings providing communications between the sleeve and the cylinder, the small piston having passages therethrough, means controlling the passages, an extension on the back of the small piston slidably connected to the sleeve, a valve in the sleeve for control of the port in the large piston, a spring in the sleeve between the valve and the extension on the small piston, a movable thrust member in the large piston cooperating with the valve to open it, and a compression member between the thrust member and the large piston.

5. A fluid pressure producing device comprising a reservoir, a cylinder supplied therefrom including a large and a small chamber, a large and a small piston movable in the respective chambers, the large piston having passages therethrough and a concentric port, a collapsible cup controlling the passages, a sleeve carried by the large piston opening into the concentric port and having openings providing communications between the sleeve and the cylinder, the small piston having passages therethrough, a collapsible cup controlling the passages, an extension on the back of the small piston slidably connected in the sleeve, a ball valve in the sleeve for controlling the port in the large piston, a spring interposed between the ball valve and the extension on the small piston, a slidable thrust block in the large piston having a part cooperating with the ball valve to open it, and a compression member interposed between the thrust block and the large piston.

6. A fluid pressure producing device comprising a reservoir, a cylinder supplied therefrom including a large chamber opening into the reservoir and having a port communicating with the reservoir and a small chamber forward of the large chamber having a passage in its wall providing a communication between the large and small chambers and a discharge port, a large and a small piston movable in the respective chambers, the large piston having passages therethrough and a concentric port, a collapsible cup controlling the passages, a sleeve carried by the large piston opening into the concentric port and having openings in its wall providing communications between the sleeve and the cylinder, the small piston having passages therethrough, a collapsible cup controlling these passages, an extension on the back of the small piston slidably connected in the sleeve, a ball valve in the sleeve controling the port in the head of the large piston, a spring in the sleeve between the ball valve and the extension on the back of the small piston, a thrust block reciprocable in the large piston, a plunger on the thrust block adapted to enter the concentric port in the head of the large piston and to engage and open the ball valve, and a compression spring in the large piston between the thrust block back of the head of the large piston.

HERBERT C. BOWEN.